May 17, 1955 L. L. ICENHOWER 2,708,275
SINK MOUNTING
Filed Aug. 26, 1954 2 Sheets-Sheet 1
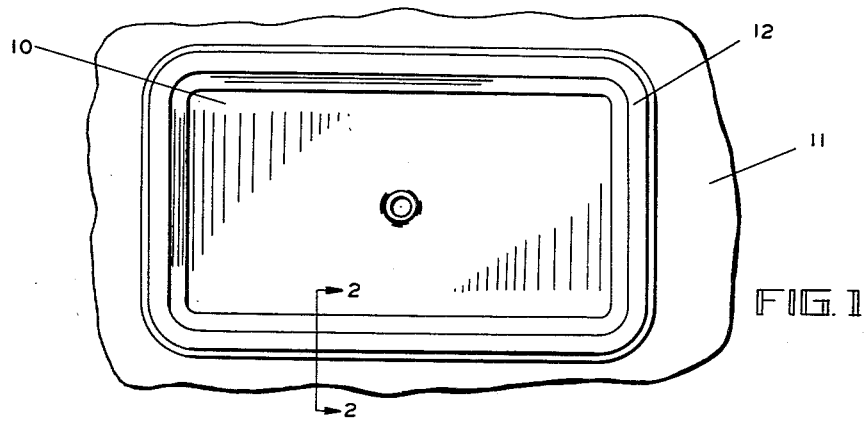
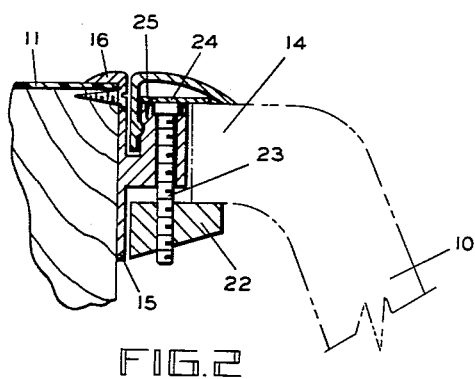
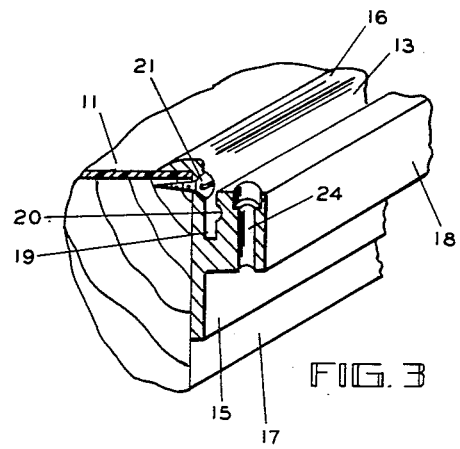
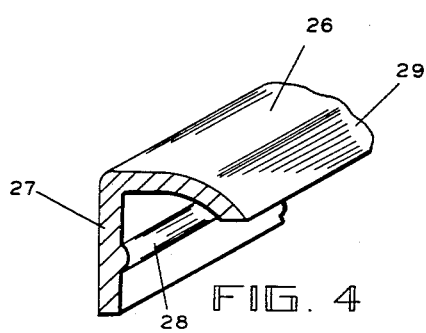
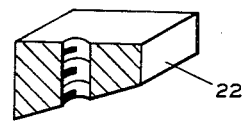
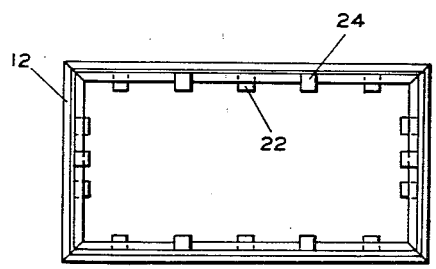
INVENTOR
LANGDON L. ICENHOWER
BY
ATTORNEYS May 17, 1955     L. L. ICENHOWER     2,708,275
SINK MOUNTING
Filed Aug. 26, 1954                          2 Sheets-Sheet 2
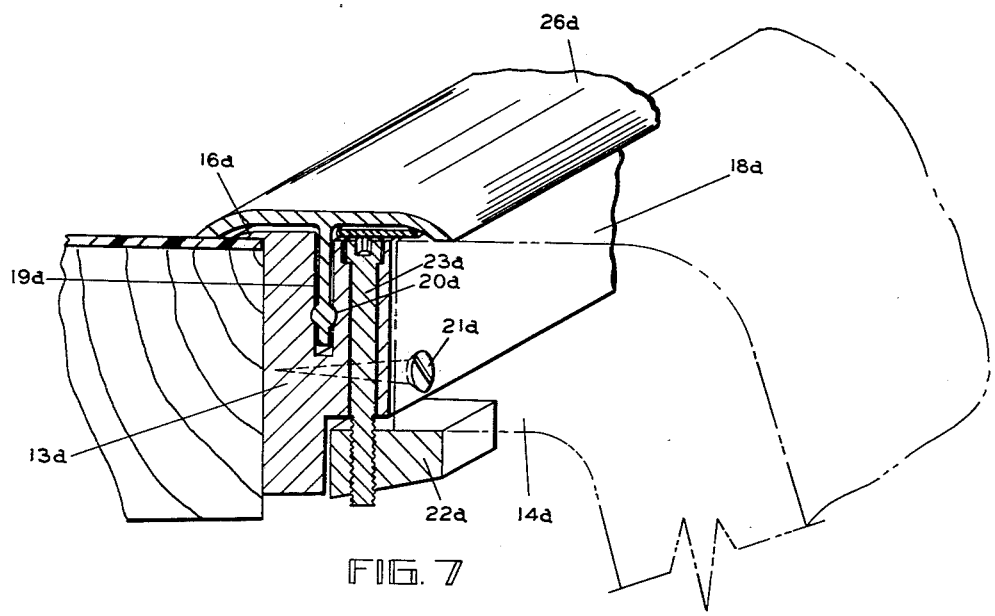
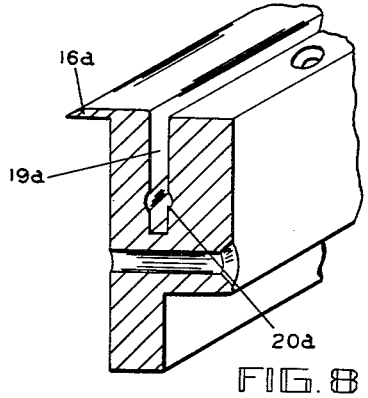
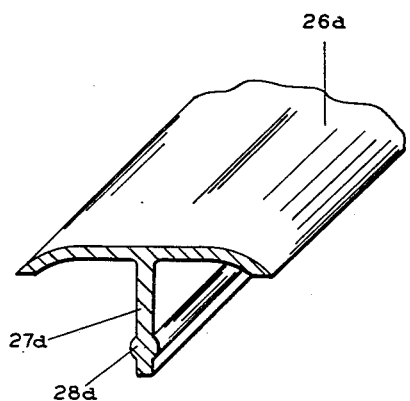
INVENTOR
LANGDON L. ICENHOWER
BY
ATTORNEYS

United States Patent Office 2,708,275
Patented May 17, 1955

2,708,275
SINK MOUNTING
Langdon L. Icenhower, Columbus, Ohio
Application August 26, 1954, Serial No. 452,366
13 Claims. (Cl. 4—187)

My invention relates to a sink mounting. It has to do, more specifically, with a mounting for a flat-rimmed sink in an opening of a drainboard cabinet or other similar structure.

There have been various sink mountings employed in the past. All of these sink mountings with which I am familiar employ clamping devices which must be adjusted from underneath the sink and drainboard. Obviously, this is undesirable in new installations because of limitation of space beneath the sink and inaccessibility and is even more undesirable in replacement work where the space is often so small that it is impossible to have access to the underside of the sink and drainboard. Furthermore, prior art devices sometimes have fastening members exposed, are not applicable universally to all types of sink coverings, and are not universally adaptable to any thickness of drainboard. Furthermore, some of the prior art devices have unsightly humps over the sink covering. Also, many of the prior art devices are of such construction that the sink bowl cannot be replaced without disturbing the sink covering.

It is the object of my invention to provide a simple and inexpensive sink mounting which will overcome all of the disadvantages pointed out above.

In the accompanying drawings I have illustrated two examples of my invention. However, it is to be understood that it can take other forms without departing from the principles of my invention.

In these drawings:

Figure 1 is a plan view of a sink mounted in a drainboard by the use of my mounting.

Figure 2 is a transverse sectional view taken substantially along the line 2—2 of Figure 1 through the rim of the sink, the adjacent edge of the drainboard, and the mounting which I provide.

Figure 3 is a similar view but partially in isometric and merely showing the mounting or sink-suspending rim which attaches to the edge provided by the drainboard opening.

Figure 4 is a transverse sectional view through the finish or cover strip or molding.

Figure 5 is a transverse sectional view through one of the hangers used in suspending the sink.

Figure 6 is a plan view of the sink-suspending rim showing the metal clips on the upper edge thereof and showing the location of the hanger members which are used in combination therewith.

Figure 7 is a view similar to Figure 2 but partially in isometric showing a modification of my sink mounting.

Figure 8 is a similar view showing only the sink-suspending rim.

Figure 9 is a similar view but showing the finish strip or molding used in the structure of Figure 7.

With reference to the drawings, in Figure 1 I have illustrated a sink 10 of the flat-rimmed type mounted in an opening formed in a drainboard 11 by means of my mounting arrangement which I will indicate generally as 12.

My mounting arrangement, as shown in Figures 2 to 6, may include an outer sink-suspending rim 13. This rim may be formed of metal or plastic or other suitable material and is of relatively heavy construction. As will later appear, it is adapted to fit between the drainboard 11 and the edge of the rim or flange 14 of the sink 10. It comprises the vertical body 15 which has an inwardly extending finish lip 16 on its upper edge. The rim 13 is disposed with the body 15 in flat contact with the edge 17 of the drainboard 11 and with the lip 16 extending over the top surface of the drainboard providing a finished surface at the edge of the drainboard. Intermediate the height of the body 15 there is provided an inwardly extending ledge 18 which is joined integrally to the body. Between the ledge and the body adjacent the upper side of the ledge, there is provided a strip-retaining slot or socket 19 which has a semi-circular groove 20 formed on its inner wall.

It will be apparent that the rim 13 will be continuous and will be of an outline corresponding to that of the rim 14 of the sink. The lip 16, the ledge 18, the slot 19, and the groove 20 also will all be continuous. The rim 13 is fastened to the drainboard by wood screws 21 which are passed through openings in the body 15 adjacent its upper edge, it being noted that the upper edge of the ledge 18 is slightly below the level of the screw-receiving openings in the rim 13 so as to facilitate insertion of the screws.

In positioning the sink in the opening in the drainboard 11, the continuous rim 13 is slipped into the opening with the lip 16 resting on the upper surface of the drainboard. Then the screws 21 are inserted and screwed into the edge of the drainboard as shown in Figure 3. In order to suspend the sink from the rim 13, it is necessary to next position the hangers 22 on the rim 13. These hangers 22 are preferably of the shape shown in Figure 5 providing a flat upper surface on which the sink rim 14 can rest. These hangers are suspended from the rim by means of the screws 23 which pass loosely down through vertical openings 24 in the ledge 18 and which are threaded through the members 22. It will be noted from Figure 2 that the hangers are spaced slightly from the body 15 of the rim 13 and extend inwardly a substantial distance beyond the inner edge of the ledge 18. It will further be noted that the heads of the screws 23 are recessed in the top edge of the ledge 18.

With the sink rim 14 resting on the hangers 22, it is merely necessary to adjust the screws 23 from above to bring the sink rim to the proper level. However, before bringing it up to the proper level, metal clips 24 are fastened to the top edge of the ledge 18 by means of screws 25. These clips 24, as shown in Figure 6, are staggered relative to the hangers 22 and will serve as stops for limiting the uppermost level of the sink rim 14 since they will extend inwardly over the rim slightly. The hangers 22 and clips 24 may be used in any suitable number.

With the parts so far mentioned in position, the sink is securely supported. However, to give the assembly a more pleasing appearance, I provide a finish strip or angle 26 which will cover all the fastening members. This strip will also preferably be continuous and of the same outline and size in plan as the rim 13. It comprises a vertically disposed attaching tongue 27 which can be inserted downwardly into the slot 19 in the rim 13. It is provided with a locking rib 28 on its inner surface which is adapted to cooperate with the locking groove 20 in the inner wall of the slot 19. The strip or angle 26 also includes the upper substantially horizontal flange which has a downturned inner edge 29. When the tongue 27 is inserted in the slot 19, the locking rib 28 will snap into the groove 20 before the lower edge of the portion 27 contacts the bottom of the slot and just as the inner edge 29 contacts the upper surface of the ledge 18. The outer side of the strip 26 will tightly abut the body 15 of the rim 13 adjacent the lip 16. The strip 26 will completely cover all of the fastening members, that is, the screws 21, the clips 24, and the screws 23.

In Figures 7 to 9, I have illustrated a modification of my structure. In this instance, the rim 13a is substantially as before except that it has an integral lip 16a which overlaps the covering at the edge of the drainboard opening. The fastening screws 21a extend completely through the inner or ledge portion 18a of the rim below the level of the slot 19a. The hanger members 22a and suspending screws 23a are arranged substantially as before. The cover strip 26a in this instance is of T-cross section and completely covers the upper edge of the rim 13a extending over and downwardly into contact with the covering on the drainboard and over and downwardly into contact with the sink rim 14a. The tongue 27a of the strip 26a will be inserted in the groove 19a and is provided with locking ribs 28a on each side which snap into cooperating grooves 20a in each wall of the slot 19a. In principle, this structure is substantially like that disclosed in Figures 2 to 6.

It will be apparent from the above that I have provided a sink mounting for flat-rimmed sinks which can be easily used both in new installations or in replacements. Because all of the installation and adjustment can be accomplished from the upper side of the drainboard, the installation is greatly facilitated. My mounting is applicable universally to all types of sink coverings and is universally adaptable to any drainboard thickness. All the fastening elements are covered completely with a finish strip which is pleasing in appearance and does not provide a big hump around the sink. In case of replacement, the sink bowl can be replaced with ease and without disturbing the drainboard covering.

Various other advantages will be apparent.

Having thus described my invention, what I claim is:

1. A mounting for a sink of the flat rim type adapted to be disposed in a drainboard opening comprising a sink-supporting rim adapted to be disposed between the edge of the opening and the edge of the sink rim, means for fastening the supporting rim to the edge of the opening, and means for suspending the sink from the supporting rim, said means comprising hanger members which engage beneath the rim of the sink, and adjusting members for hanging said hanger members from the supporting rim and adjustable from the upper side of said rim.

2. A sink mounting according to claim 1 in which the adjusting members are screws which loosely pass downwardly through the supporting rim and which have their lower ends threaded into said hanger members.

3. A sink mounting according to claim 2 in which the screws are supported in a ledge extending inwardly from the vertically disposed body of the supporting rim, said hanger members being spaced from the body and extending inwardly beyond the ledge and beneath the sink rim.

4. A sink mounting according to claim 3 including stop clips attached to the supporting rim and extending over the upper surface of the sink rim.

5. A sink mounting according to claim 3 in which the supporting rim is provided with a lip extending over the top surface of the drainboard adjacent said opening.

6. A sink mounting according to claim 5 including a finish strip, said strip having a tongue which slips into a slot formed in the upper edge of said supporting rim.

7. A sink mounting according to claim 6 including an interfitting locking rib and groove between the tongue and the adjacent wall of the slot.

8. A sink mounting according to claim 7 in which the finish strip extends over the ledge of the supporting rim and the sink rim and abuts the lip on the supporting rim.

9. A sink mounting according to claim 7 in which the finish strip extends over said lip onto the drainboard and over the ledge onto the sink rim.

10. A sink mounting according to claim 4 in which the means for fastening the supporting rim to the drainboard edge comprises screws passing horizontally through the rim into the drainboard.

11. A sink mounting according to claim 10 in which the ledge terminates below the upper edge of the supporting rim and the fastening screws pass through the rim above the level of the ledge.

12. A sink mounting according to claim 11 in which the stop clips are supported on the ledge and extend inwardly therefrom.

13. A sink mounting according to claim 11 in which the fastening screws extend through the ledge and the body of the rim.

No references cited.